US008588328B2

(12) United States Patent
Tsubota (10) Patent No.: US 8,588,328 B2
(45) Date of Patent: Nov. 19, 2013

(54) INFORMATION TRANSMISSION SYSTEM, INFORMATION TRANSMISSION DEVICE, INFORMATION TRANSMISSION METHOD, AND COMPUTER READABLE MEDIUM STORING A PROGRAM FOR INFORMATION TRANSMISSION

(75) Inventor: Hirokazu Tsubota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 573 days.

(21) Appl. No.: 12/723,171

(22) Filed: Mar. 12, 2010

(65) Prior Publication Data

US 2011/0019762 A1    Jan. 27, 2011

(30) Foreign Application Priority Data

Jul. 21, 2009  (JP) ................................. 2009-170601

(51) Int. Cl.
*H04L 27/00*        (2006.01)

(52) U.S. Cl.
USPC ........... 375/295; 375/219; 375/220; 375/225; 375/275; 375/260; 710/106; 710/107; 710/305; 710/313; 710/314; 710/315

(58) Field of Classification Search
USPC ................ 375/219, 220, 225, 275, 295, 260; 710/106, 107, 305, 313, 314, 315
See application file for complete search history.

(56) References Cited

U.S. PATENT DOCUMENTS

| 7,277,477 | B1 * | 10/2007 | Ahmad ......................... 375/220 |
| 2007/0258478 | A1 * | 11/2007 | Wu et al. ...................... 370/437 |
| 2007/0292135 | A1 * | 12/2007 | Guo et al. ..................... 398/106 |
| 2008/0013645 | A1 | 1/2008 | Muto et al. |
| 2008/0137719 | A1 * | 6/2008 | Kawamoto .................... 375/224 |

FOREIGN PATENT DOCUMENTS

| JP | A-9-214720 | 8/1997 |
| JP | A-2008-22392 | 1/2008 |
| JP | A-2008-146457 | 6/2008 |

* cited by examiner

*Primary Examiner* — Daniel Washburn
*Assistant Examiner* — Rahel Guarino
(74) *Attorney, Agent, or Firm* — Oliff & Berridge, PLC (57) ABSTRACT

The present invention provides a information transmission device including: a transmission section that transmits information to a first transmission path that transmit information serially; a reception section that receives information from a second transmission path; a waveform shaping section that, according to setting information, shapes at least one of a signal waveform of the information for transmission, and/or a signal waveform of the information for reception; and a controller that, when establishing communication, controls the transmission section to transmit predetermined first information that requests communication establishment, and effects control to change the first setting information and controls the transmission section to re-transmit the first setting information when the reception section has not received the first information within an interval that from the beginning of transmission of the first information until a predetermined duration required for communication establishment has elapsed.

15 Claims, 9 Drawing Sheets

INFORMATION TRANSMISSION SYSTEM, INFORMATION TRANSMISSION DEVICE, INFORMATION TRANSMISSION METHOD, AND COMPUTER READABLE MEDIUM STORING A PROGRAM FOR INFORMATION TRANSMISSION

CROSS-REFERENCE TO RELATED APPLICATION

This application is based on and claims priority under 35 USC 119 from Japanese Patent Application No. 2009-170601 filed on Jul. 21, 2009.

BACKGROUND

Technical Field

The present invention relates to an information transmission system, an information transmission device, an information transmission method, and a computer readable medium storing a program for information transmission.

SUMMARY

According to an aspect of the invention, there is provided an information transmission system including: a first information transmission device, including, a first transmission section that transmits information to a first transmission path of a pair of transmission paths that transmit information serially, a first reception section that receives the information from a second transmission path of the pair of transmission paths, a first waveform shaping section that, according to first setting information, shapes at least one of a signal waveform of the information for transmission from the first transmission section, and/or a signal waveform of the information for reception by the first reception section, and a first controller that, when establishing communication, controls the first transmission section so as to transmit predetermined first information that requests communication establishment, and effects control so as to change the first setting information and controls the first transmission section to re-transmit the first setting information when the first reception section has not received the first information within an interval from the beginning of transmission of the first information until a predetermined duration required for communication establishment has elapsed; and a second information transmission device including, a second reception section that receives the information from the first transmission path, a second transmission section that transmits information to the second transmission path, a second waveform shaping section that, according to second setting information, shapes at least one of a signal waveform of the information for transmission from the second transmission section and/or a signal waveform of the information for reception by the second reception section, and a second controller that effects control so as to change the second setting information and controls the second transmission section so as to transmit the first information, when the first information is received by the second reception section.

BRIEF DESCRIPTION OF THE DRAWINGS

Exemplary embodiments of the present invention will be described in detail based on the following figures, wherein.

DETAILED DESCRIPTION

Herebelow, an example of an exemplary embodiment of the present invention will be described in detail with reference to the drawings. Explanation below is of a case where the present invention is applied to an information transmission system that transmits and receives information between two devices.

Figure 1:
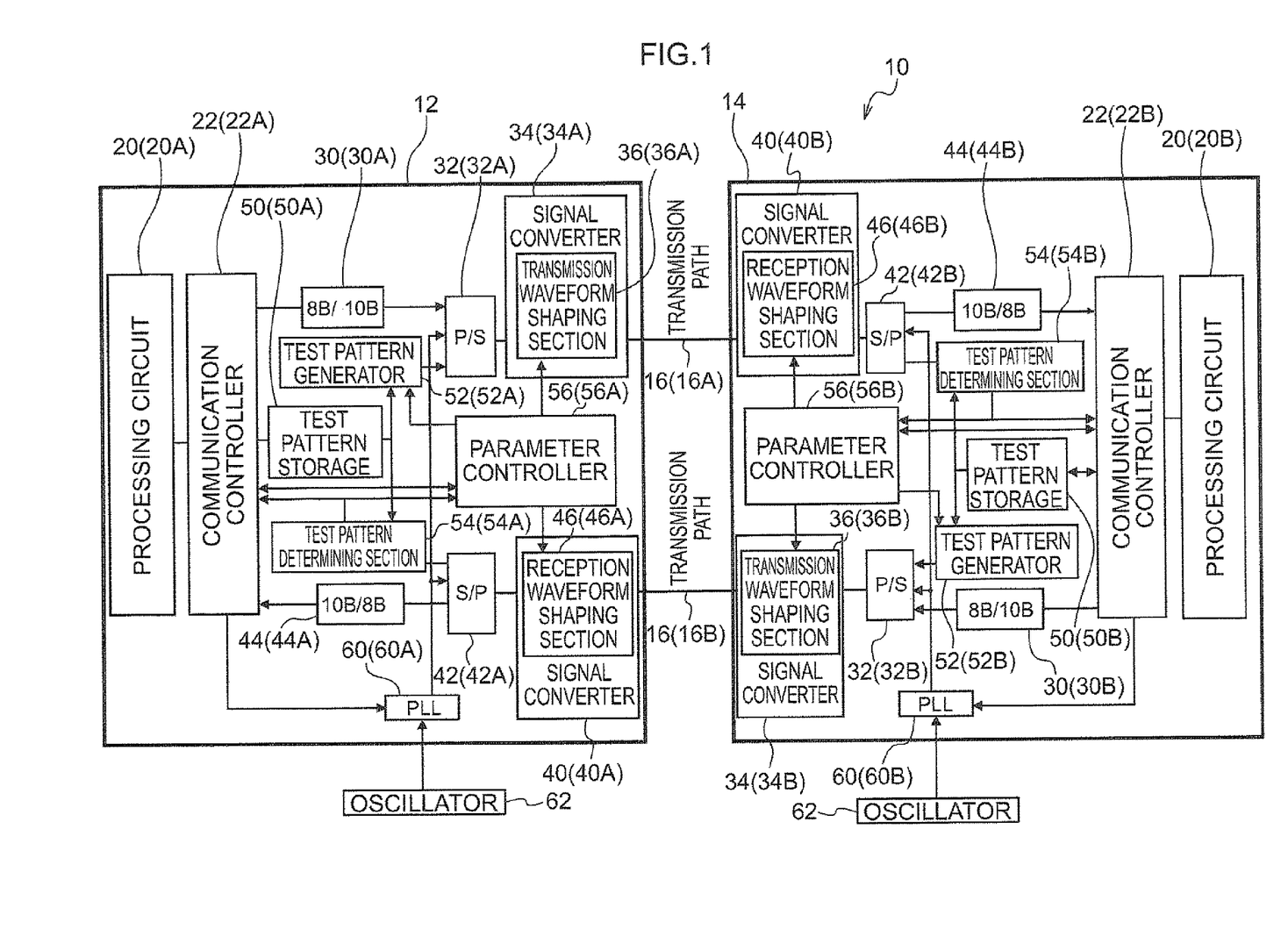
FIG. 1 is a block diagram showing an overall schematic configuration of an information transmission system according to an exemplary embodiment.

A block diagram showing an overall schematic configuration of an information transmission system 10 according to an exemplary embodiment is illustrated in FIG. 1. Note that, a device 12 and a device 14 are of substantially the same configuration. Therefore, explanation below regarding the transmission side that transmits information will mainly employ the device 12 configuration. Further, explanation regarding the reception side that receives information mainly employs the device 14 configuration. Similar portions of the transmission side of the device 14 to those of the transmission side of the device 12 are allocated the same reference numerals, and explanation thereof is omitted. Further, similar portions of the reception side of the device 12 and the reception side of the device 14 are allocated the same reference numerals, and explanation thereof is omitted. In the following explanation, when discrimination is made between similar portions on the device 12 and on the device 14, the reference numeral on the device 12 side is suffixed with "A" and the device 14 side is suffixed with "B".

The information transmission system 10 is connected to the device 12 and the device 14 by a pair of transmission paths 16 (16A, 16B). The transmission path 16A is a transmission path that transmits information from the device 12 to the device 14. The transmission path 16B is a transmission path that transmits information from the device 14 to the device 12. Each of the transmission paths 16 is a difference line path through which a difference signal is transmitted, configured by two wiring paths each, respectively. The transmission path 16A and the transmission path 16B may be configured as a single cable, having four wiring paths bundled together and covered by a covering layer from the outside. The transmission path 16A and the transmission path 16B may also be configured as two cables, each having two wiring paths bundled together. In the present exemplary embodiment, there is only one of each of the transmission paths 16A, 16B. However, an increase in the speed of information transmission between the devices may be achieved by providing multiple parallel transmission paths therefor.

The device 12 includes a processing circuit 20 and a communication controller 22. The processing circuit 20 is designed according to the purpose of the device. The communication controller 22 controls the transmission and reception of information between the communication controller 22 and external devices. A protocol for communication control is installed in the communication controller 22. The communication controller 22 controls operations relating to communication by flow control, using hardware control. Information subjected for transmission is input from the processing circuit 20 to the communication controller 22. The communication controller 22 also outputs information transmitted from an external device to the processing circuit 20.

Information for transmission is input from the processing circuit 20 to the communication controller 22. The communication controller 22 outputs transmitted information from an external device to the processing circuit 20.

The device 12 includes, at the transmission side for transmitting information, with an 8B/10B encoder (8B/10B) 30, a parallel/serial converter (P/S) 32, and a signal converter 34. The 8B/10B encoder 30 is connected to the output side of the communication controller 22. Further, the parallel/serial converter 32 is connected to the output side of the 8B/10B encoder 30. Furthermore, the signal converter 34 is connected to the output side of the parallel/serial converter 32.

The 8B/10B encoder 30 performs 8B/10B encoding on data input from the communication controller 22. The 8B/10B encoder 30 is pre-stored with plural 10 bit patterns that apply to 8 bit information. The 8B/10B encoding is performed by selecting a pattern for conversion so that there is an even balance of 1's and 0's in serial data. In the present exemplary embodiment, since the 8B/10B encoding incorporates clock information within the data, the requirement to provide a separate clock signal in the information for transmission is eliminated.

The parallel/serial converter 32 converts the data encoded by the 8B/10B encoder 30 into a serial bit string, and outputs to the signal converter 34.

The signal converter 34 converts the digital bit string input from the parallel/serial converter 32 into an electrical signal, and outputs the electrical signal to the transmission paths 16. Here, with recent micro technique, the operation till the 8B/10B encoder 30 is performed at around 1.0 V. The signal converter 34 amplifies the digital data operating at around 1.0 V to an electric signal at around 3.3 V to output. The signal converter 34 is provided with a transmission waveform shaping section 36. According to set parameters (setting information), the transmission waveform shaping section 36 shapes a signal waveform by performing at least one of partial amplification (pre-emphasis) of a signal waveform output to the transmission paths 16 and/or partial attenuation (de-emphasis) of the signal waveform.

The reception side that receives information of the device 14 includes a signal converter 40, a serial/parallel (SIP) converter 42, and an 8B/10B decoder (10B/8B) 44. The serial/parallel converter 42 is connected to the output side of the signal converter 40. Further, the 8B/10B decoder 44 is connected to the output side of the serial/parallel converter 42. Furthermore, the communication controller 22 is connected to the output side of the 8B/10B decoder 44.

The signal converter 40 converts the electrical signal received from the transmission paths 16 to digital serial data. A reception waveform shaping section 46 is provided to the signal converter 40. The reception waveform shaping section 46 includes an equalizer therein. The reception waveform shaping section 46 shapes a signal waveform by partially emphasizing the received signal waveform and/or partially attenuating the signal waveform, in accordance with set parameters (setting information).

The serial/parallel converter 42 converts the serial data converted by the signal converter 40 into parallel bit strings, and outputs to the 8B/10B decoder 44.

The 8B/10B decoder 44 performs 8B/10B decoding on the parallel data converted by the serial/parallel converter 42, and outputs to the communication controller 22.

The device 12 further includes a test pattern storage 50, a test pattern generator 52, a test pattern determining section 54, and a parameter controller 56. The test pattern generator 52 is connected to the communication controller 22, the parallel/serial converter 32, and the test pattern storage 50. The test pattern determining section 54 is connected to the serial/parallel converter 42 and to the test pattern storage 50. The parameter controller 56 is connected to the communication controller 22, the transmission waveform shaping section 36, the reception waveform shaping section 46, the test pattern generator 52, and the test pattern determining section 54.

The test pattern storage 50 stores in advance, pattern information that indicates plural test patterns used in a transmission quality test. The test pattern information may be information of the test pattern itself, or information such as arithmetic expression for deriving the test pattern.

The test pattern generator 52 generates information for transmission quality detection, that are test patterns expressed by pattern information stored in the test pattern storage 50. Next, the test pattern generator 52 outputs the data for transmission quality test, to the parallel/serial converter 32. This data for transmission quality test is the data in which a value of each bit at least a portion thereof is changed per bit for testing the transmission quality. When receiving the data for transmission quality test from the test pattern generator 52, the parallel/serial converter 32 converts the received data into a serial bit string and outputs to the signal converter 34.

The test pattern determining section 54 compares the data input from the serial/parallel converter 42 with the test pattern expressed by the pattern information stored in the test pattern storage 50, and derives the Bit Error Rate (BER) thereof. Next, the test pattern determining section 54 outputs the BER to the communication controller 22 and the parameter controller 56.

The parameter controller 56 controls setting of the parameters for the transmission waveform shaping section 36 and the reception waveform shaping section 46. The parameter controller 56, based on the transmission quality detected by the test pattern determining section 54, sets the parameters of the transmission waveform shaping section 36 and the reception waveform shaping section 46 in order to achieve a communicable transmission quality. As the parameters set in the transmission waveform shaping section 36 and the reception waveform shaping section 46, for example, parameters to give the highest transmission quality may be set. The parameters may also be selected from those that give a transmission quality that is of a predetermined communicable level, or higher.

The device 12 further includes a Phase Locked Loop (PLL) circuit 60. The communication controller 22, the 8B/10B encoder 30, the 8B/10B decoder 44, the test pattern storage 50, the test pattern generator 52, the test pattern determining section 54, the parameter controller 56 and the PLL circuit 60 are all supplied, as an operation clock, with a clock signal of predetermined frequency from an external oscillator 62. The PLL circuit 60 has a built-in counter. Integer values in a predetermined range are settable in the counter of the PLL circuit 60. The PLL circuit 60 phase locks the frequency of the supplied clock signal at a frequency that is an integer multiple of that which was set in the counter, and generates an integer multiple clock signal. The generated clock signal is supplied as an operation clock to the parallel/serial converter 32 and to the serial/parallel converter 42. Note that, in FIG. 1, the clock signal lines from the oscillator 62 to the communication controller 22, the 8B/10B encoder 30, the 8B/10B decoder 44, the test pattern storage 50, the test pattern generator 52, the test pattern determining section 54 and the parameter controller 56 are omitted.

The PLL circuit 60 is connected to the communication controller 22. The counter built into the PLL circuit 60 is set with a value from the communication controller 22. Thereby, by changing the setting value of the counter built into the PLL circuit 60, the communication controller 22 changes the frequency of the clock signal generated. Due thereto, the transmission speed of the information is changed. Namely, in the device 12, the transmission speed, of the transmission of information via the transmission paths 16, is changeable.

Next, the operation of the information transmission system 10 according to the present exemplary embodiment is explained.

When the device 12 attempts to transmit information to the device 14, predetermined information for establishing communication is repeatedly transmitted to the transmission path 16A, requesting communication establishment to the device 14. When the device 14 attempts to transmit information to the device 12, predetermined information for establishing communication is repeatedly transmitted along the transmission path 16B, requesting communication establishment to the device 12. For example, in PCI Express, such information for establishing communication employs data of K28.5.

Figure 2:
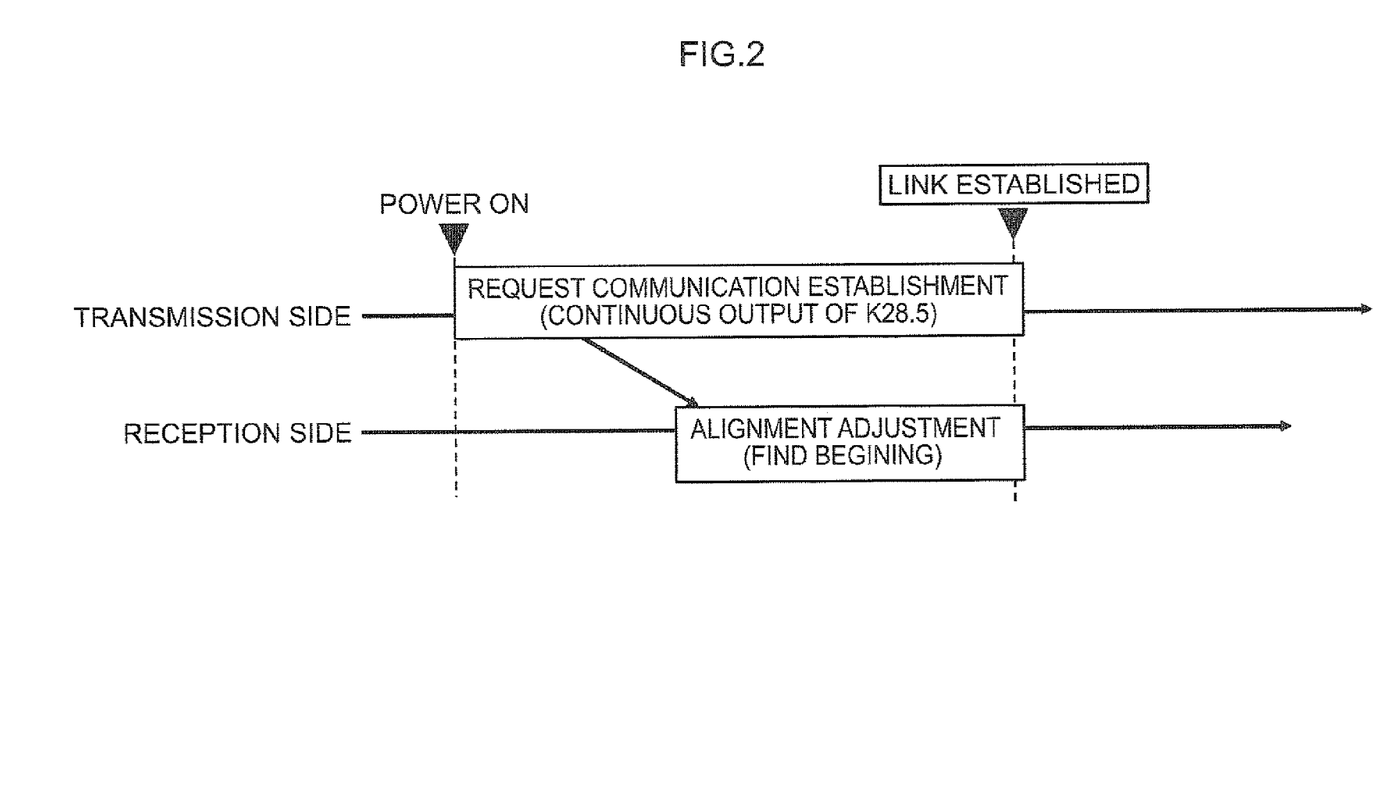
FIG. 2 is a schematic diagram showing a flow when establishing communication between devices.

As shown in FIG. 2, for example, when K28.5 is employed as the information for establishing communication, the transmission side repeatedly transmits the data of K28.5 for requesting communication establishment. The reception side compares the received data with the data of K28.5 and finds the beginning of a match position (i.e., alignment adjustment). Next, the reception side establishes the communication by controlling the synchronization of the data, based on the match position.

However, transmission paths 16 have different signal waveform loss characteristics, depending on their type, distance of use, and purpose. Furthermore, while holding the transmission speed fixed (for example at 5 Gbps), when the cable length of the transmission paths 16 is changed, the signal waveform changes, due to the cable loss. Accordingly, the higher the transmission speed, the more difficult it is to establish communication. Furthermore, even when communication is established, the higher the transmission speed, the higher the frequency of error-bits, leading to a deterioration in the transmission quality.

Figure 3:
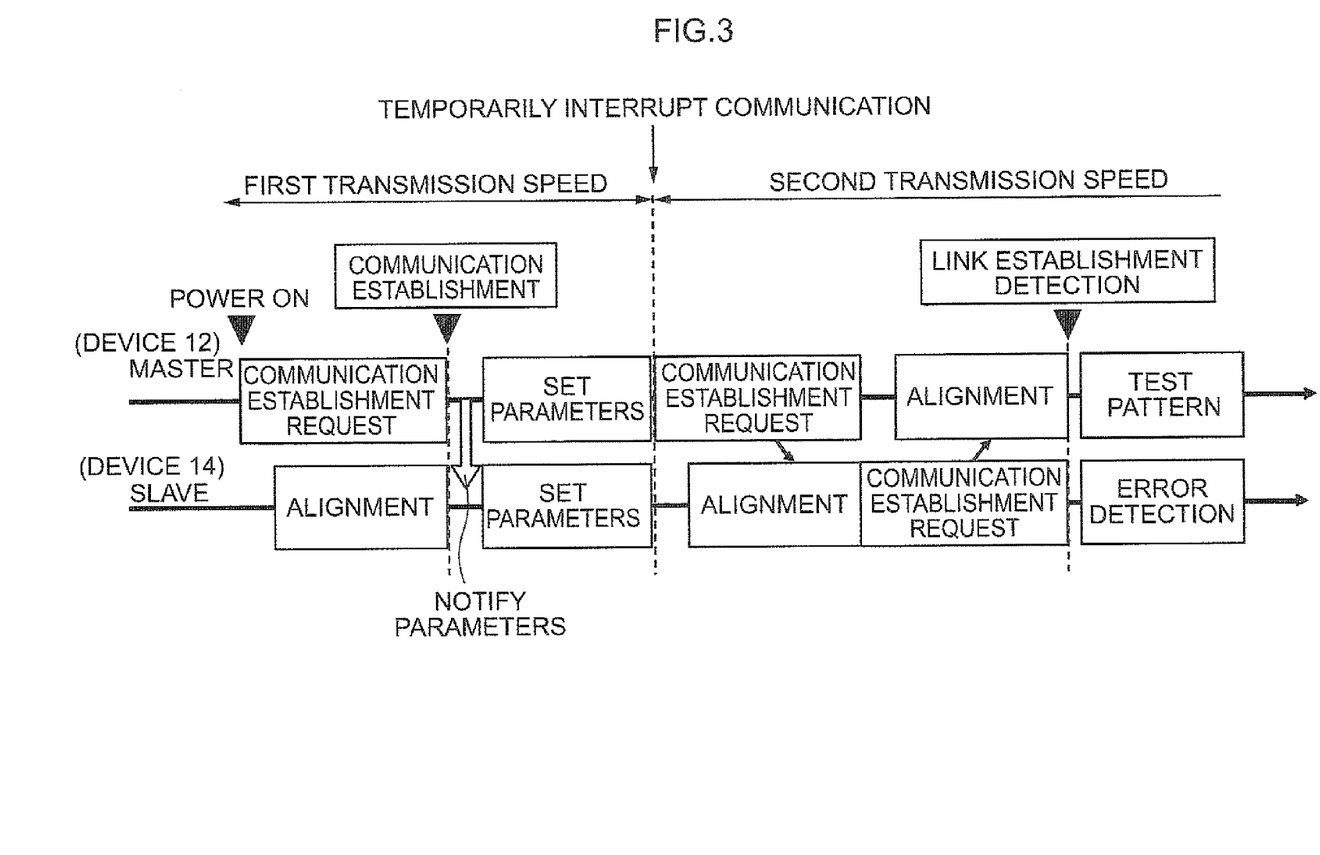
FIG. 3 is a schematic diagram showing information flow when establishing communication between devices in an information transmission system according to an exemplary embodiment.

In the information transmission system 10 according to the present exemplary embodiment, as shown in FIG. 3, for example, the communication is established with the device 12 acting as the master device, and the device 14 acting as the slave device. In such cases, in the information transmission system 10 according to the present exemplary embodiment, initial communication is established at a slow first transmission speed (for example 2.5 Gbps) for transmitting information at a level that is communicable irrespective of loss in the transmission paths 16. Next, communication is performed in the information transmission system 10 to notify parameters from the master to the slave. Next, after interrupting communication at the first transmission speed, the information transmission system 10 sets the notified parameters. Furthermore, the information transmission system 10 attempts to establish communication at a second transmission speed (for example 5 Gbps) that is faster than the first transmission speed.

As a technique to ascertain whether communication has been established, for example, when the device 12 is acting as master and the device 14 is acting as slave, initially the device 12 repeatedly transmits information for establishing communication to the device 14, via the transmission path 16A. Due thereto, the device 12 requests establishment of communication on the transmission path 16A side. When communication is established on the transmission path 16A side, with the establishment of communication as the trigger, the device 14 repeatedly transmits the information for establishing communication to the device 12, via the transmission path 16B. The device 14 thereby requests communication establishment, and establishes communication on the transmission path 16B side.

Due thereto, if communication is established on the transmission path 16B side, this means that communication has been established in both the transmission path 16A and the transmission path 16B directions. Therefore, the transmission of a special separate signal along with transmission and reception becomes redundant.

After establishing communication in both directions, in order to detect the transmission quality, the device 12 and the device 14 transmit data of test patterns to each other via the transmission path 16A and the transmission path 16B, and derive the BER.

This test pattern is a pattern selected out of a pattern that contains many changes, or a pattern which is likely to be an error. Note that, in the above, for the BER test, a test pattern that has a portion where value of each bit is changed per bit, is used.

Note that, PRBS (Pseudo random Bit Sequence) is known as a test pattern often used when detecting the BER. Namely, when the 8B/10B conversion is used, PRBS $2^7-1$ is often used as a test pattern. In PRBS $2^7-1$, the transmission quality is tested by transmitting 127 test patterns.

In the present exemplary embodiment, the transmission quality is detected by using the PRBS $2^7-1$. Accordingly, the transmission side transmits the 127 test patterns in a predetermined sequence. When the data is received, the reception side compares the received data with the corresponding test pattern information and derives the BER.

However, when information is transmitted at the second transmission speed in the transmission paths 16, there are sometimes cases when the signal waveform is distorted due to cable-loss, as described above, resulting in communication establishment being unattainable.

Figure 4:
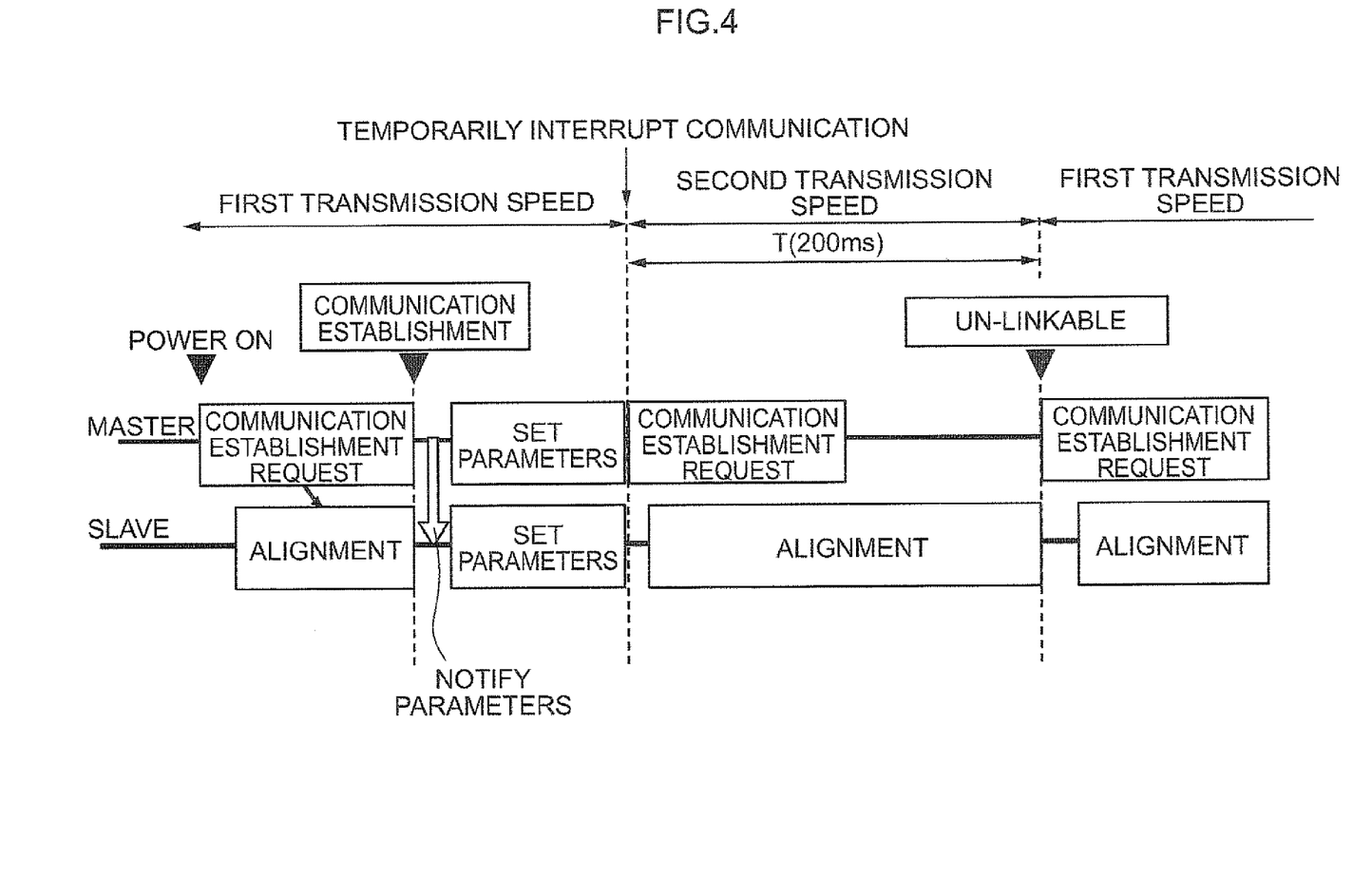
FIG. 4 is a schematic diagram showing information flow when communication cannot be established between devices in an information transmission system according to an exemplary embodiment.

In such cases, as shown in FIG. 4, the device 12 calculates a duration from the time of start of transmission of information for establishing communication to the device 14 via the transmission path 16A. Next, after the device 12 has started transmission of information for establishing communication, when the information for establishing communication has not been received at the transmission path 16B, even though a predetermined duration T required for establishing communication in sequence in both the transmission path 16A and the transmission path 16B directions, has elapsed, this case is treated as un-linkable. In such cases, the device 12 re-establishes communication at the slower first transmission speed, and notifies different parameters for setting the transmission waveform shaping section 36 and the reception waveform shaping section 46.

Note that for example, in PCI Express, the time for communication establishment is 100 ms. The predetermined duration T, in consideration of the time for communication establishment in PCI Express, adds the duration for out and return, and is, for example, 200 ms. In the present exemplary embodiment, when communication has not been established, after 200 ms has elapsed from the start of transmission of information for establishing communication, it is treated as timed out, and as un-linkable.

However, for example, there is a possibility that communication is established at the second transmission speed by chance, due to the peripheral environment, timing, or the like.

Figure 5:
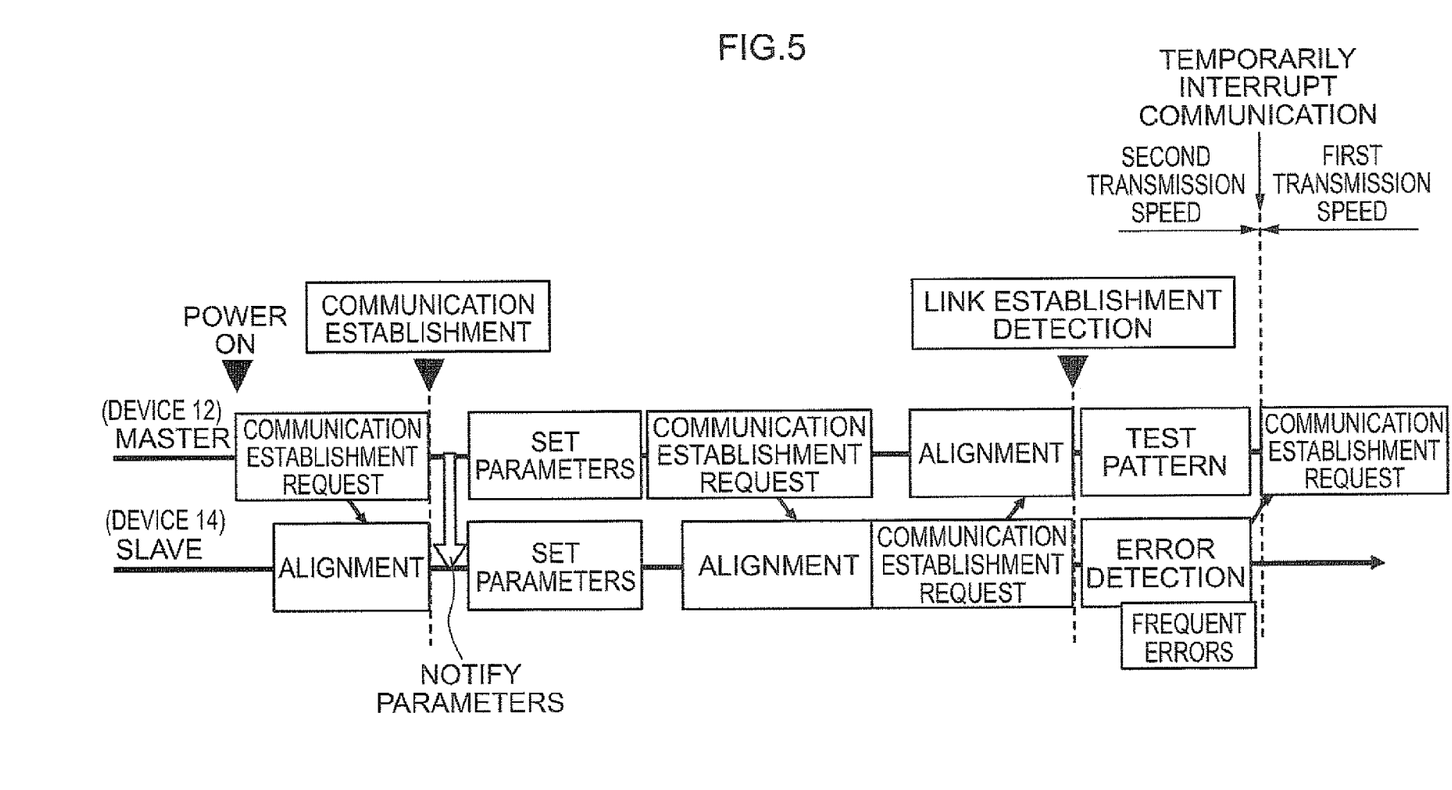
FIG. 5 is a schematic diagram showing information flow when frequent errors occur, during transmission quality detection, between devices in an information transmission system according to an exemplary embodiment.

In such cases, as shown in FIG. 5, after communication establishment at the second transmission speed, data of a test pattern is transmitted. However, in such circumstances where it is marginal whether or not a link can be established, errors frequently occur during transmission quality detection of the test pattern.

When errors frequently occur in this manner, communication may be re-established at the slower first transmission speed, and different parameters notified.

Hereinafter, a detailed process flow when attempting communication establishment in the present exemplary embodiment, will be explained based in the process in the master device and the process in the slave device.

Figure 6A:
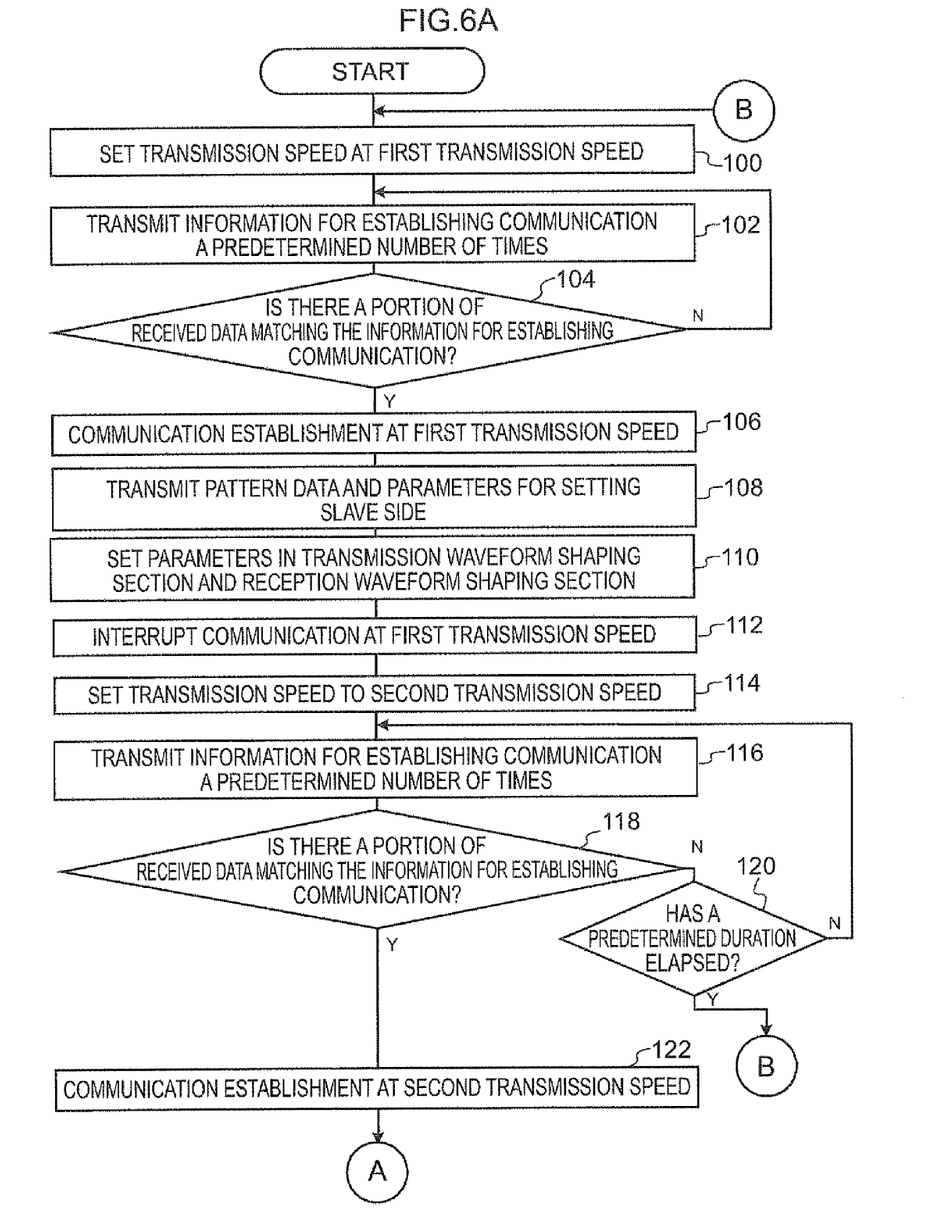
FIG. 6A and FIG. 6B are flow charts showing information transmission processing flow in a device acting as a master when establishing communication in a information transmission system according to an exemplary embodiment.
Figure 6B:
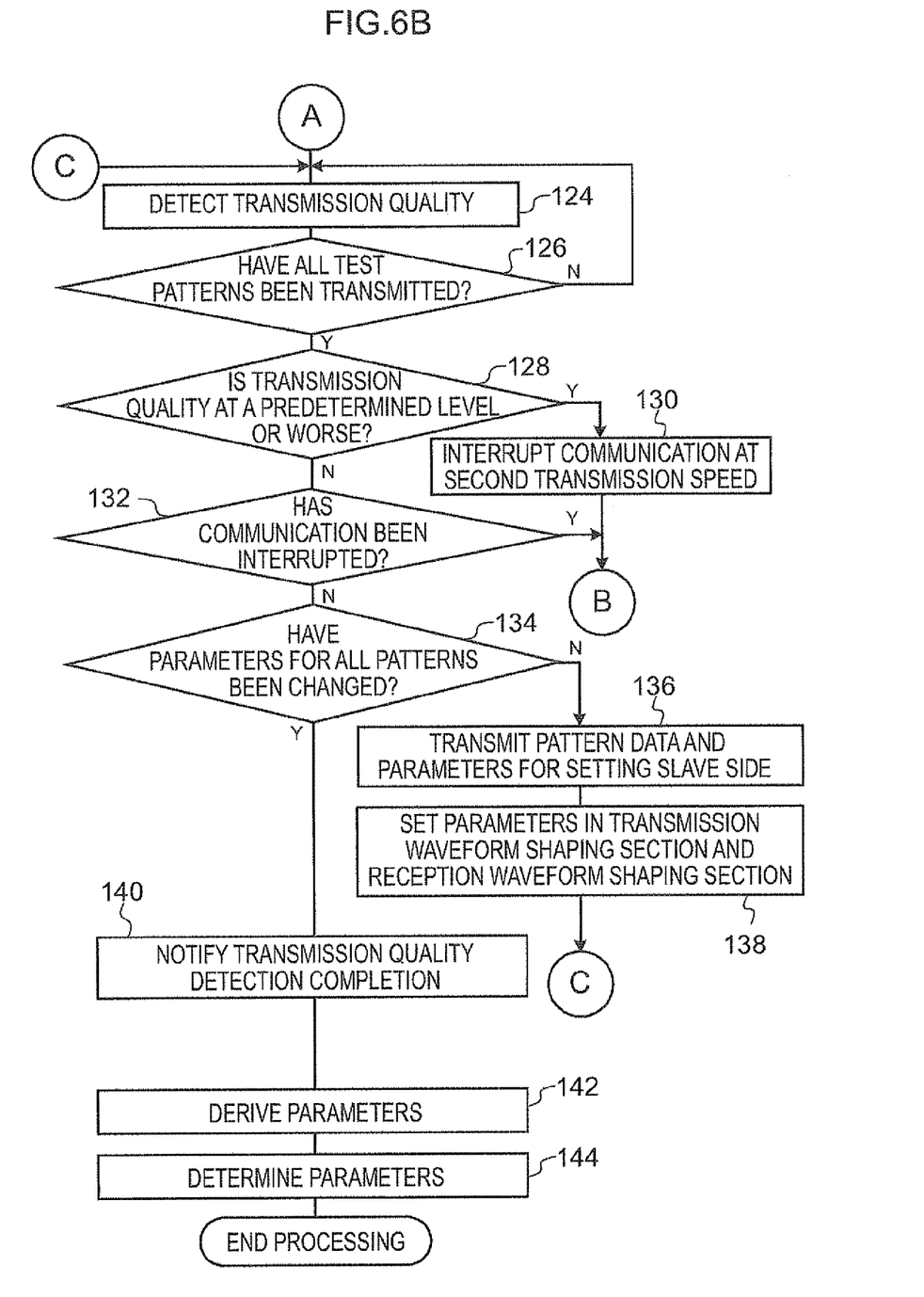

Information transmission process flow when attempting to establish communication, in a device acting as master, is shown in FIG. 6A and FIG. 6B.

In step 100, the value of the counter included in the PLL circuit 60 is changed, and the first transmission speed is set as the transmission speed In step 102, data of K28.5 is transmitted, as the information for establishing communication, a predetermined number of times (for example 10 times) to the slave via one of the transmission paths 16 (the transmission path 16A when the device 12 is the master and the device 14 is the slave, the transmission path 16B when the device 14 is the master and the device 12 is the slave).

In step 104, received data, that has been transmitted by the other of the transmission paths 16 (the transmission path 16B when the device 12 is the master and the device 14 is the slave, the transmission path 16A when the device 14 is the master and the device 12 is the slave) is checked with the data of K28.5, and determination is made as to whether there is a matching portion. When the determination is affirmative, the process proceeds to step 106. When the determination is negative, the process returns to step 102, with standby maintained for reception of information for establishing communication.

In step 106, latching control is performed on the data, based on the matched position, and communication is established at the first transmission speed. In the present exemplary embodiment, when the information for establishing communication from the slave is received, and communication is established, and this means that communication in both directions has been established.

In step 108, pattern information indicating test patterns employed in transmission quality detection, and parameters for setting the transmission waveform shaping section 36 and the reception waveform shaping section 46 on the slave side, are transmitted to the slave via one of the transmission paths 16. Note that, the parameters for setting in the transmission waveform shaping section 36 and in the reception waveform shaping section 46 on the slave side, are changed in a predetermined sequence each time of process in step 108 and step 136, described later.

In step 110, parameters are set in the transmission waveform shaping section 36 and the reception waveform shaping section 46 of the device itself. Note that, the parameters set in the transmission waveform shaping section 36 and the reception waveform shaping section 46 of the master side are changed in a predetermined sequence each time of process in step 110 and step 138. Here, when the parameter of the transmission waveform shaping section 36 and the parameter of the reception waveform shaping section 46 are changed simultaneously, which change of the parameters has affected the transmission quality, may not be determined. Therefore, the change order is set such that the parameters of the transmission waveform shaping section 36 and the parameters of the reception waveform shaping section 46 are changed separately, or by turns.

In step 112, communication at the first transmission speed is interrupted.

In step 114, the value of the counter built into the PLL circuit 60 is changed, and the transmission speed is changed to the second transmission speed.

In step 116, as the information for establishing communication, data of K28.5 is transmitted a predetermined number of times (for example 10 times) to the slave via one of the transmission paths 16.

In step 118, determination is made as to whether the information for establishing communication from the slave has been received via the other of the transmission paths 16. When this determination is affirmative, the process proceeds to step 122. However, when the determination is negative, the process proceeds to step 120.

In step 120, determination is made as to whether a predetermined duration (for example 200 ms) has elapsed since the start of the transmission of the information for establishing communication at above step 116. When the determination is affirmative, the process proceeds to step 100. However, when the determination is negative, the process proceeds to step 116.

In step 122, data synchronization and the like is performed, based on the matched positions, and communication at the second transmission speed is established.

In step 124, transmission quality detection is performed. In this transmission quality detection, data of a test pattern expressed by pattern information is generated, and the generated data of the test pattern is transmitted via one of the transmission paths 16. In the transmission quality detection, the received data by the other of the transmission paths 16 is compared with the test pattern information expressed by the pattern information, and the BER is derived.

In step 126, determination is made as to whether transmission of all of the test patterns is complete. When the determination is affirmative the process proceeds to step 128. However, when the determination is negative the process proceeds to step 124.

In step 128, determination is made as to whether the results of transmission quality detection obtained by the process of above step 124 indicate that information transmission is at a predetermined inappropriate level, or worse. When the determination is affirmative the process proceeds to step 130. When the determination is negative the process proceeds to step 132.

In step 130, transmission at the second transmission speed is interrupted, and the process returns to step 100. In step 100, transmission is re-started at the first transmission speed.

In step 132, determination is made as to whether communication was interrupted from the slave side at the second transmission speed. When the determination is affirmative the process returns to step 100. In step 100, transmission is re-started at the first transmission speed. However, when the determination is negative the process proceeds to step 134.

In step 134, determination is made as to whether changing the parameters has been completed for all of the patterns.

When the determination is affirmative the process proceeds to step 140. When the determination is affirmative the process proceeds to step 136.

In step 136, the next parameters for setting the transmission waveform shaping section 36 and the reception waveform shaping section 46 are transmitted.

In step 138, the next parameters are set in the transmission waveform shaping section 36 and the reception waveform shaping section 46 for the devise itself. Then the process returns to step 124.

In step 140, detection complete information, expressing transmission quality detection completion, is transmitted.

In step 142, the parameters for the transmission waveform shaping section 36 and the reception waveform shaping section 46 are derived, based on the transmission quality detection result, to give a communicable transmission quality.

In step 144, the parameters derived in above step 142 are set in the transmission waveform shaping section 36 and the reception waveform shaping section 46, and processing is ended.

Figure 7A:
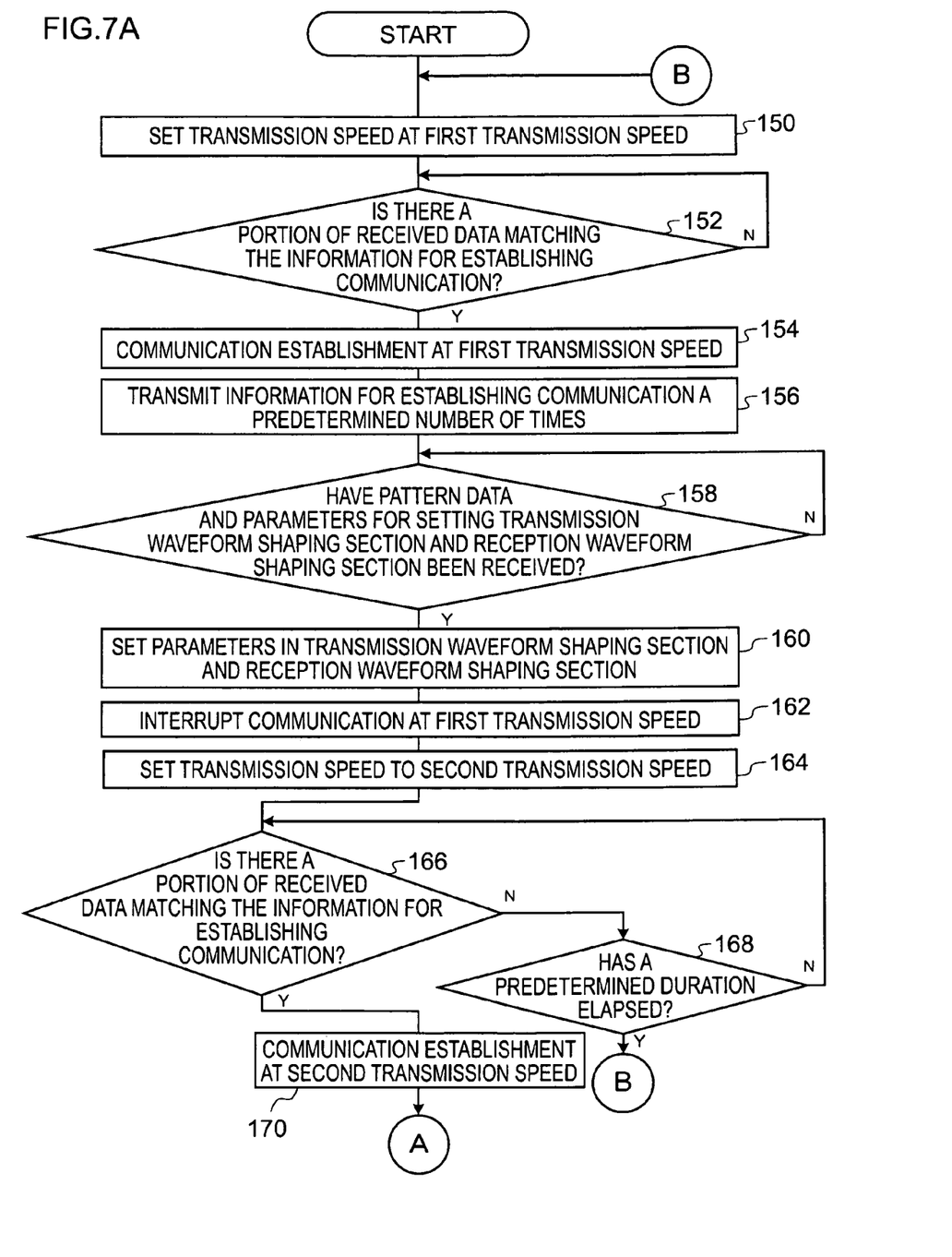
FIG. 7A and FIG. 7B are flow charts showing information transmission processing flow in a device acting as a slave when establishing communication in an information transmission system according to an exemplary embodiment.
Figure 7B:
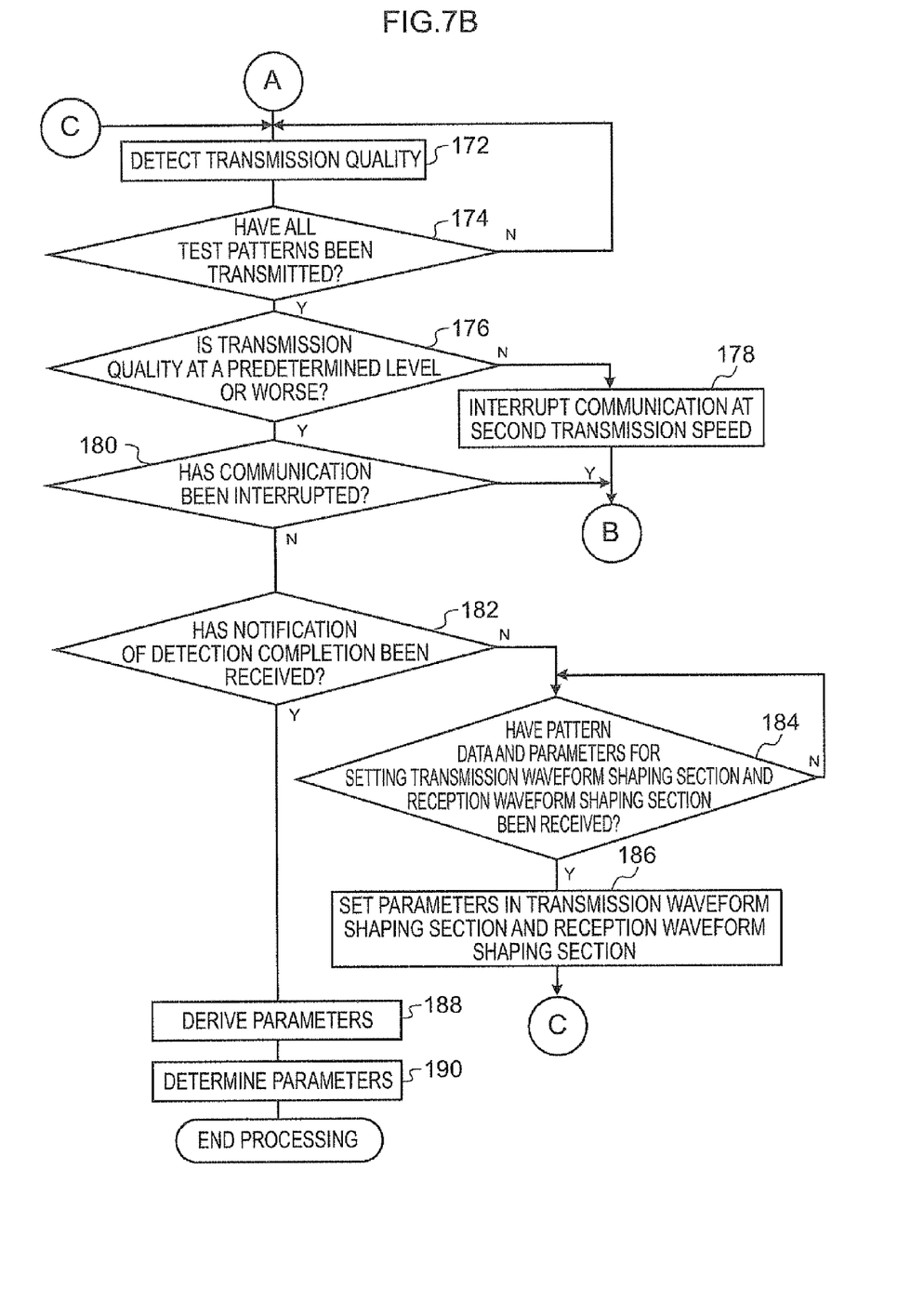

FIG. 7A and FIG. 7B show the information transmission process flow at the device acting as the slave when attempting to establish communication.

In step 150, the value of the counter built into the PLL circuit 60 is changed, and the first transmission speed is set as the transmission speed In step 152, received data, that was transmitted by one of the transmission paths 16 is checked with the data of K28.5, and determination is made as to whether there is matching portion. When the determination is affirmative, the process proceeds to step 154. When the determination is negative, the process returns to step 152, and standby is maintained for reception of information for establishing communication.

In step 154, data synchronization and the like is performed on the data, based on the matched position, and communication is established at the first transmission speed.

In step 156, the information for establishing communication is transmitted a predetermined number of times to the master via the other of the transmission paths 16.

In step 158, standby is maintained for reception of pattern information, and parameters for setting the transmission waveform shaping section 36 and the reception waveform shaping section 46 on the slave side, that are transmitted from the master via the first of the transmission paths 16.

In step 160, the parameters received in step 158 are set in the transmission waveform shaping section 36 and the reception waveform shaping section 46 of the device itself.

In step 162, communication at the first transmission speed is interrupted.

In step 164, the value of the counter built into the PLL circuit 60 is changed, and the transmission speed is changed to the second transmission speed.

In step 166, checking is performed of the received data transmitted via the first of the transmission paths 16 and the data of K28.5, and determination is made as to whether there is a matching portion. When the determination is affirmative the process proceeds to step 170. When the determination is negative the process proceeds to step 168.

In step 168, determination is made as to whether a predetermined duration (for example 200 ms) has elapsed since the start of maintaining standby for reception of the information for establishing communication, in above step 166. When the determination is affirmative, the process returns to step 150. However, when the determination is negative, the process returns to step 166.

In step 170, data synchronization and the like are performed on the data, based on the matched position, and communication at the second transmission speed is established.

In step 172, transmission quality detection is performed. In this transmission quality detection, data of a test pattern, expressed by the pattern information received at above step 156, is generated. Next, in the transmission quality detection, the generated test pattern information is transmitted to the maser via the other of the transmission paths 16. In the transmission quality detection, the received data from the master by the first of the transmission paths 16 is compared with the test pattern information expressed by the pattern information received in step 156, and the BER is derived.

In step 174, determination is made as to whether transmission of all of the test patterns is complete. When the determination is affirmative the process proceeds to step 176. However, when the determination is negative the process proceeds to step 172.

In step 176, determination is made as to whether the results of transmission quality detection obtained by the processing of above step 172 indicate that information transmission is at a predetermined inappropriate level, or worse. When the determination is affirmative the process proceeds to step 180. When the determination is negative the process proceeds to step 178.

In step 178, transmission at the second transmission speed is interrupted, and the process returns to step 150. In step 150, transmission is re-started at the first transmission speed.

In step 180, determination is made as to whether communication was interrupted from the master side at the second transmission speed. When the determination is affirmative the process returns to step 150, and transmission is re-started at the first transmission speed. However, when the determination is negative the process proceeds to step 182.

In step 182, determination is made as to whether detection complete information, indicating completion of transmission quality detection, has been received. When the determination is affirmative the process proceeds to step 188. However, when the determination is negative the process proceeds to step 184.

In step 184, standby is maintained for receipt of the next parameters for setting in the transmission waveform shaping section 36 and the reception waveform shaping section 46 at the slave side, that are transmitted from the master through the first of the transmission paths 16.

In step 186, the parameters received in step 184 are set in the transmission waveform shaping section 36 and the reception waveform shaping section 46 for the devise itself. Then the process proceeds to step 172.

In step 188, the parameters for the transmission waveform shaping section 36 and the reception waveform shaping section 46 are derived, based on the transmission quality detection result, to give a communicable transmission quality.

In step 190, the parameters derived in above step 188 are set in the transmission waveform shaping section 36 and the reception waveform shaping section 46, and processing is ended.

In the above-described exemplary embodiment, a case where each time transmission quality detection is performed, the master transmits the parameters for setting the transmission waveform shaping section 36 and the reception waveform shaping section 46 on the slave side to the slave, has been described. However, the present invention is not limited thereto. For example, in an alternative exemplary embodiment, configuration may be made in which the master transmits plural parameters and sequence information expressing and a parameter selection sequence to the slave each time transmission quality detection is performed. Further, in another alternative exemplary embodiment, configuration may be made in which the slave changes the parameters according to the selection sequence expressed in the sequence information, and transmission quality detection is successively performed. In a further alternative exemplary embodiment, configuration may be made in which the change sequence of parameters is determined in advance, and information relating to each of the parameters is stored in both the master and the slave. In this further alternative exemplary embodiment, there is no requirement for the master to transmit the parameters to the slave.

Furthermore, in an alternative exemplary embodiment, the communication controller 22 of the master stores parameters that obtained good transmission quality in the past, and configuration is made such that selection is made from these stored parameters and the parameters close to these stored parameters.

Furthermore, in the above-described exemplary embodiment, a case where the transmission waveform shaping section 36 is provided in the transmission side of each of the devices, and a reception waveform shaping section 46 in the reception side of each of the devices, has been described. However, the present invention is not limited thereto. For example, in an alternative exemplary embodiment, configuration may be made in which the transmission waveform shaping section 36 or the reception waveform shaping section 46 is only provided at one or the other side.

Furthermore, in the above-described exemplary embodiment, a case where the PRBS $2^7-1$ is used as the test pattern, has been described. However the test pattern is not limited thereto.

Furthermore, in the above-described exemplary embodiment, a case where the K28.5 is employed as the information for establishing communication, has been described. However the information for establishing communication is not limited thereto.

Furthermore, a program that executes the information transmission processes shown in FIG. 6A, FIG. 6B, FIG. 7A and FIG. 7B according to the above-described exemplary embodiment, may be stored in advance in a storage such as (HDD Hard Disk Drive), stored in a memory device such as ROM, stored in a computer readable storage medium such as CD-ROM or DVD-ROM, may be provided or distributed via wire or wireless communication, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information transmission system comprising:
   a first information transmission device, including,
      a first transmission section that transmits information to a first transmission path of a pair of transmission paths that transmit information serially,
      a first reception section that receives the information from a second transmission path of the pair of transmission paths,
      a first waveform shaping section that, according to first setting information, shapes at least one of a signal waveform of the information for transmission from the first transmission section, and/or a signal waveform of the information for reception by the first reception section, and
      a first controller that, when establishing communication, controls the first transmission section so as to transmit predetermined first information that requests communication establishment, and effects control so as to change the first setting information and controls the first transmission section to re-transmit the first setting information when the first reception section has not received the first information within an interval from the beginning of transmission of the first information until a predetermined duration required for communication establishment has elapsed; and
   a second information transmission device including,
      a second reception section that receives the information from the first transmission path,
      a second transmission section that transmits information to the second transmission path,
      a second waveform shaping section that, according to second setting information, shapes at least one of a signal waveform of the information for transmission from the second transmission section and/or a signal waveform of the information for reception by the second reception section, and
      a second controller that effects control so as to change the second setting information and controls the second transmission section so as to transmit the first information, when the first information is received by the second reception section.

2. The information transmission system according to claim 1, wherein:
   the first transmission section and the second transmission section are configured to switch transmission speeds between a first transmission speed that transmits information at a communicable level even with loss in the pair of transmission paths and a second transmission speed that is faster than the first transmission speed;
   the first controller controls the first transmission section to transmit the first information at the first transmission speed when establishing communication, and thereafter switches the transmission speed of the first transmission section to the second transmission speed; and
   the second controller controls the second transmission section to transmit the first information at the first transmission speed when the first information is received by the second reception section, and thereafter switches the transmission speed of the second transmission section to the second transmission speed.

3. The information transmission system according to claim 2, wherein:
   the first controller controls the first transmission section to transmit the second setting information for setting the second waveform shaping section at the first transmission speed; and
   the second controller sets the second setting information received by the second reception section in the second waveform shaping section.

4. The information transmission system according to claim 2, further comprising:
   a detection section that detects transmission quality of the pair of transmission paths, and wherein:
   when the detection section detects that the transmission quality of the first transmission path at the second transmission speed is at a predetermined level or lower, the first controller sets the transmission speed for transmission from the first transmission section to the first transmission speed; and when the detection section detects that the transmission quality of the second transmission path at the second transmission speed is at a predetermined level or lower, the second controller sets the transmission speed for transmission from the second transmission section to the first transmission speed.

5. An information transmission device comprising:
a transmission section that transmits information to a first transmission path of a pair of transmission paths that transmit information serially;
a reception section that receives information from a second transmission path of the pair of transmission paths;
a waveform shaping section that, according to setting information, shapes at least one of a signal waveform of the information for transmission, and/or a signal waveform of the information for reception; and
a controller that, when establishing communication, controls the transmission section to transmit predetermined first information that requests communication establishment, and effects control to change the first setting information and controls the transmission section to re-transmit the first setting information when the reception section has not received the first information within an interval that from the beginning of transmission of the first information until a predetermined duration required for communication establishment has elapsed.

6. An information transmission device comprising:
a reception section that receives information from a first transmission path of a pair of transmission paths that transmit information serially;
a transmission section that transmits information to a second transmission path of the pair of transmission paths;
a waveform shaping section that, according to setting information received over the first transmission path, shapes at least one of a signal waveform of the information for transmission and/or a signal waveform of the information for reception; and
a controller that, when predetermined first information that requests communication establishment is received by the reception section, effects control so as to change the setting information used for shaping the at least one signal waveform and controls the transmission section so as to transmit the first information.

7. The information transmission device of claim 6, wherein
the transmission section is configured to switch transmission speeds between a first transmission speed that transmits information at a communicable level even with loss in the pair of transmission paths and a second transmission speed that is faster than the first transmission speed, and
the controller (i) controls the transmission section to transmit the first information at the first transmission speed when establishing communication, and thereafter switches the transmission speed of the transmission section to the second transmission speed, and (ii) controls the transmission section to transmit the first information at the first transmission speed when the first information is received by the reception section, and thereafter switches the transmission speed of the transmission section to the second transmission speed.

8. A method for transmitting information in an information transmission device including a transmission section that transmits information to a first transmission path of a pair of transmission paths that transmit information serially, a reception section that receives information from a second transmission path of the pair of transmission paths, a waveform shaping section that shapes a signal waveform of the information, and a controller that performs control, the information transmission method comprising:
shaping, according to setting information received over the first transmission path, at least one of a signal waveform for transmission, and/or a signal waveform for reception;
transmitting predetermined first information that requests communication establishment to the transmission section, when establishing communication; and
changing the setting information used for shaping the at least one signal waveform when the first information is not received within an interval from the beginning of transmission of the first information until a predetermined duration required for communication establishment has elapsed; and
re-transmitting the first information.

9. The method of claim 8, wherein
the transmission section is configured to switch transmission speeds between a first transmission speed that transmits information at a communicable level even with loss in the pair of transmission paths and a second transmission speed that is faster than the first transmission speed, and
the controller (i) controls the transmission section to transmit the first information at the first transmission speed when establishing communication, and thereafter switches the transmission speed of the transmission section to the second transmission speed, and (ii) controls the transmission section to transmit the first information at the first transmission speed when the first information is received by the reception section, and thereafter switches the transmission speed of the transmission section to the second transmission speed.

10. A method for transmitting information in an information transmission device including a reception section that receives information from a first transmission path of a pair of transmission paths that transmit information serially, a transmission section that transmits information to a second transmission path of the pair of transmission paths, a waveform shaping section that shapes a signal waveform of the information, and a controller that performs control, the information transmission method comprising:
shaping, according to setting information received over the first transmission path, at least one of a signal waveform for transmission and/or a signal waveform for reception;
changing the setting information used for shaping the at least one signal waveform in response to predetermined first information that requests communication establishment being received; and
transmitting the first information.

11. The method of claim 10, wherein
the transmission section is configured to switch transmission speeds between a first transmission speed that transmits information at a communicable level even with loss in the pair of transmission paths and a second transmission speed that is faster than the first transmission speed, and
the controller (i) controls the transmission section to transmit the first information at the first transmission speed when establishing communication, and thereafter switches the transmission speed of the transmission section to the second transmission speed, and (ii) controls the transmission section to transmit the first information at the first transmission speed when the first information is received by the reception section, and thereafter switches the transmission speed of the transmission section to the second transmission speed.

12. A non-transitory computer readable medium storing a program causing an information transmission device to execute a process for information transmission, the information transmission device including a transmission section that transmits information to a first transmission path of a pair of transmission paths that transmit information serially, a reception section that receives information from a second transmission path of the pair of transmission paths, a waveform shaping section that shapes a signal waveform of the information, and a controller that performs control, and the process comprising:
    shaping, according to setting information received over the first transmission path, at least one of a signal waveform for transmission, and/or a signal waveform for reception;
    transmitting predetermined first information that requests communication establishment to the transmission section, when establishing communication; and
    changing the setting information used for shaping the at least one signal waveform when the first information is not received within an interval from the beginning of transmission of the first information until a predetermined duration required for communication establishment has elapsed; and
    re-transmitting the first information.

13. The non-transitory computer readable medium of claim 12, wherein
    the transmission section is configured to switch transmission speeds between a first transmission speed that transmits information at a communicable level even with loss in the pair of transmission paths and a second transmission speed that is faster than the first transmission speed, and
    the controller (i) controls the transmission section to transmit the first information at the first transmission speed when establishing communication, and thereafter switches the transmission speed of the transmission section to the second transmission speed, and (ii) controls the transmission section to transmit the first information at the first transmission speed when the first information is received by the reception section, and thereafter switches the transmission speed of the transmission section to the second transmission speed.

14. A non-transitory computer readable medium storing a program causing an information transmission device to execute a process for information transmission, the information transmission device including a reception section that receives information from a first transmission path of a pair of transmission paths that transmit information serially, a transmission section that transmits information to a second transmission path of the pair of transmission paths, a waveform shaping section that shapes a signal waveform of the information received over the first transmission path, and a controller that performs control, and the process comprising:
    shaping, according to setting information, at least one of a signal waveform for transmission and/or a signal waveform for reception;
    changing the setting information used for shaping the at least one signal waveform in response to predetermined first information that requests communication establishment being received; and
    transmitting the first information.

15. The non-transitory computer readable medium of claim 14, wherein
    the transmission section is configured to switch transmission speeds between a first transmission speed that transmits information at a communicable level even with loss in the pair of transmission paths and a second transmission speed that is faster than the first transmission speed, and
    the controller (i) controls the transmission section to transmit the first information at the first transmission speed when establishing communication, and thereafter switches the transmission speed of the transmission section to the second transmission speed, and (ii) controls the transmission section to transmit the first information at the first transmission speed when the first information is received by the reception section, and thereafter switches the transmission speed of the transmission section to the second transmission speed.

* * * * *